Figure 10:
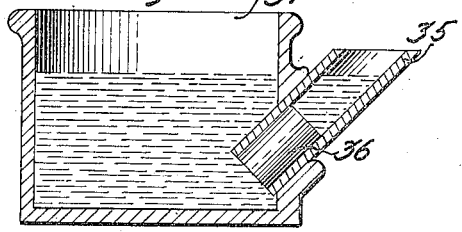

Oct. 30, 1923.
B. B. GOLDSMITH
1,472,066
INK CONTAINER
Filed July 28, 1921     3 Sheets-Sheet 1
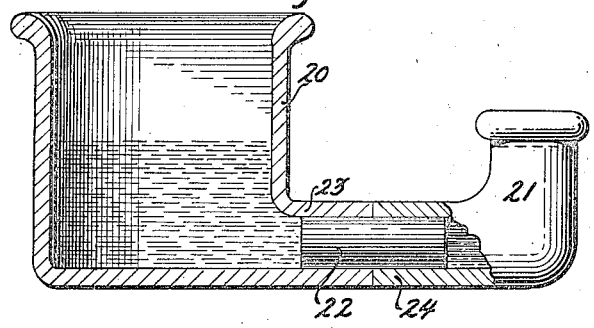
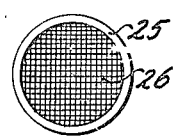
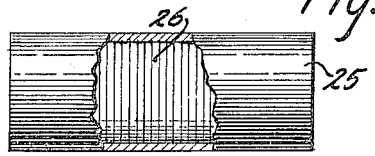
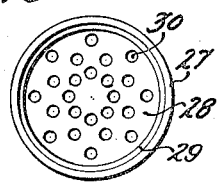
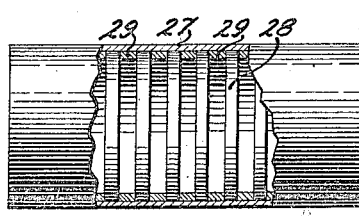
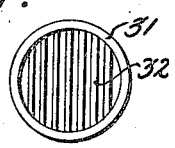
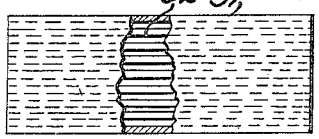
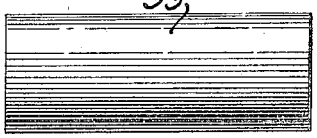
Byron B. Goldsmith
INVENTOR
BY
ATTORNEY Oct. 30, 1923.

B. B. GOLDSMITH

INK CONTAINER

Filed July 28, 1921

1,472,066

3 Sheets-Sheet 3

Byron B. Goldsmith
INVENTOR

BY H. S. Mackey
ATTORNEY

Patented Oct. 30, 1923.

1,472,066

UNITED STATES PATENT OFFICE.

BYRON B. GOLDSMITH, OF NEW YORK, N. Y.

INK CONTAINER.

Application filed July 28, 1921. Serial No. 488,124.

*To all whom it may concern:*

Be it known that I, BRYON B. GOLDSMITH, a citizen of the United States, residing in New York, county and State of New York, have invented a certain Improvement in Ink Containers, of which the following is a specification.

The inconveniences of transporting ink in liquid form are well known. The accidental opening or breakage of a single bottle can easily ruin the contents of a trunk and, where ink is shipped commercially in considerable quantities the possibility of accidents of this kind is accompanied by other disadvantages. Among these may be named the disproportionate weight of the bottles and the freezing of the ink in cold weather.

These and other reasons have long made it desirable to supply ink in a solid form, suitable for convenient transportation, being light and easily packed, incapable of freezing, and adapted to be dissolved in water when needed for writing purposes. This problem appears not to have found a satisfactory solution. The reason for this appears to be the necessity for too much manipulation and the expenditure of too much time and care in producing a suitable solution of the nonliquid mass, whether solid or pasty. It has been necessary, in prior proposed systems to employ a bottle of a definite size for a certain amount of solid ink, and it has taken time to produce solution and adequate diffusion. The ink first used has been too weak, and has grown stronger with time, producing a lack of uniformity in color of the writing. Prior systems have often necessitated shaking, with danger of scattering ink with disastrous results.

My present invention relates to improved means for supplying ink whereby the various disadvantages above outlined are avoided, and whereby the objections to ordinary liquid ink are obviated. For this purpose I have devised an ink stand or ink well composed in part of an ink producing member preferably so disposed that the water which is poured into the well or stand reaches the dipping space, in finding its natural level, through passages in said member, which passages are provided with a material capable of producing liquid ink when acted upon by the water. This material is herein referred to as "ink producing material."

By this means the dipping space is constantly provided with new liquid formed by water percolating into such space through the ink producing member. The passage for water is so proportioned that the water flows inward promptly to replace the ink removed and, at the same time enough ink producing material is dissolved to make a suitable writing fluid. The ink producing member may be of any suitable nature, and my present invention is not concerned with the matter of the composition. In other and copending applications for patent I have described and claimed certain forms of ink-producing members per se.

My invention covers also a combination of a reservoir, bottle or the like with an ink producing member affording a suitable passage, even when not combined with a dipping space or liquid ink holder.

Figure 11:
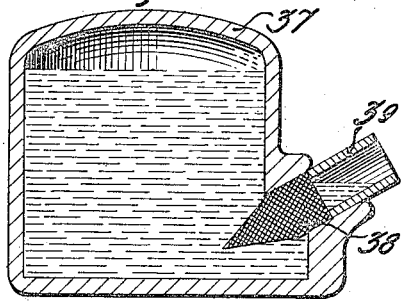
Figure 12:
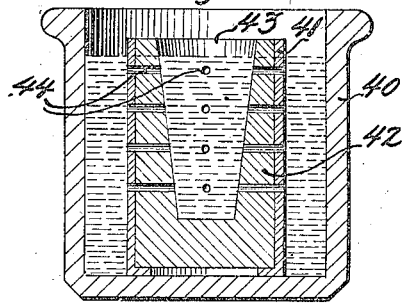
Figure 13:
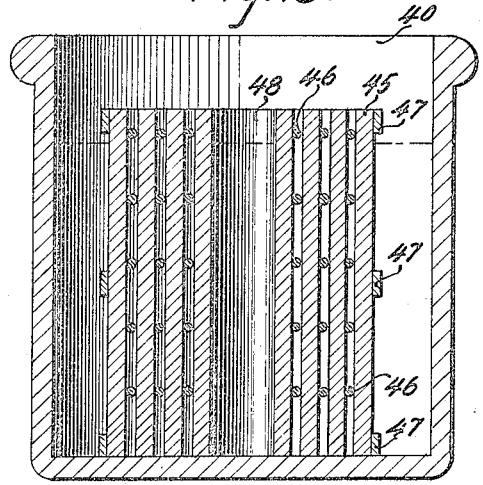
Figure 14:
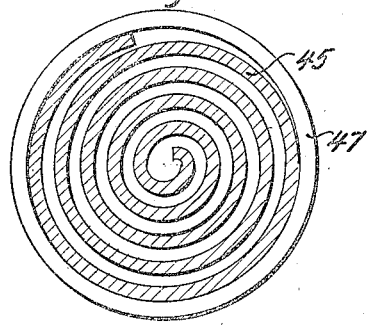
Figure 15:
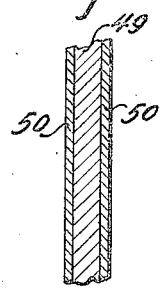
Figure 16:
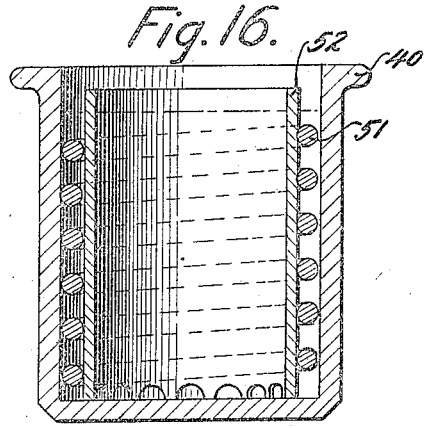

My invention is illustrated in a number of possible modifications, by way of example, in the accompanying drawings, wherein Figure 1 is a view in vertical section of a typical embodiment of the invention, Figures 2, 3, 4 and 5 are end views and Figures 6, 7, 8 and 9 are side views of examples of ink producing members, Figures 10, 11, 12 and 13 are views in vertical section of other forms of the complete device, Figure 14 is a view in horizontal section of the ink producing member shown in Figure 13, Figure 15 is an enlarged sectional view of a part of the member shown in Figure 14, and Figure 16 is a view in vertical section of still another form of complete device.

My preferred apparatus supplies a water container or reservoir and a container for liquid ink (hereinafter referred to as a "dipping space") so combined with an ink producing member that water will run from the reservoir to the dipping space through the ink producing member, being converted into liquid ink in so doing. This is preferably accomplished by the use of a separable and replaceable ink producing member, which may be termed an "ink cartridge."

As will be seen hereinafter, the dipping space may, in some modifications of the invention, be wholly or partly surrounded by the ink producing member, but this is not essential.

In Figure 1, there is shown an ink stand formed of two separable parts, namely, the water reservoir 20 and the ink holder or dipping space 21. These are united through an ink producing member 22 which fits the abutting necks 23 and 24 of the parts 20 and 21 respectively. When water is poured into the reservoir, it runs through the member 22 until a common level is found, say at the dotted line in the figure. The flow will then cease until ink is withdrawn from 21, when more water will flow in through 22. This process continues and furnishes a new supply of freshly made ink until the water is practically exhausted. When the ink producing material in the member 22 is exhausted, a new cartridge or member may be inserted.

The ink producing member 22 may take a great variety of forms without departing from the invention. Essentially it may be described as a device containing ink producing material so disposed as to be adequately acted upon by a stream of water passing through it under the expected conditions of use. Preferably this is accomplished by providing sensible passages wholly or partly lined with the ink producing material. Such passages may be formed in the ink producing material itself or between a number of ink producing bodies assembled together, and such material may be homogeneous throughout or be deposited upon the surface of a neutral backing, which may or may not be absorbent in its nature.

In Figures 2 and 6, for instance, there is shown a member comprising an external cylinder 25 of hard rubber, fiber or other appropriate material, within which are placed juxtaposed parallel discs 26 made of a network of absorbent material impregnated and coated with ink producing material. The water passes through the meshes in the discs 26 successively and takes up the ink producing material, so that it finally emerges from the cylinder in the form of a liquid ink.

In Figures 3 and 7 is shown a member comprising a cylinder 27, containing parallel discs 28, spaced apart, as by rings 29, and perforated, as shown at 30. These may be discs of solid ink producing material or they may be made of neutral material, such as straw board, coated with such material.

In the form shown in Figures 4 and 8, the external cylinder 31 contains parallel plates 32, placed longitudinally, so as to afford straight passages from end to end of the cylinder. These plates are either formed of ink producing material or are made of a neutral backing faced with the same, wholly or in part. Figure 8 is a plan view looking down on Figure 4, and the edges of the plates are indicated by dotted lines.

In the form shown in Figures 5 and 9, the cylinder 33 contains a spirally disposed sheet 34 of the character already described, for furnishing the ink producing material.

In Figure 10 is shown a form in which the outer envelope or casing 35 of the ink producing member is prolonged to form the dipping space. Here the active portion containing the ink producing material is confined to the lower end 36 of the member. In this form the ink stand is completed by simply inserting the lower end of the ink producing member into a suitably inclined opening in one side of the reservoir 37. It is obvious that by placing the opening at or near the top of the reservoir, the entire apparatus may be employed as a means for forming liquid ink by merely pouring the water out into a separate vessel through the ink producing member.

A similar arrangement is shown in Figure 11, but here the active portion of the ink producing member is formed by rolling a sheet or sheets of impregnated mesh 38 into conical form and attaching it to the outer support 39. Also, in this modification the top of the reservoir 37 is shown closed. This form can be filled by removing the cartridge and tipping back the reservoir until the opening is on top. On then restoring the cartridge 39 and bringing the entire device into the position shown, the water liquid ink will attain some such levels as are indicated by the dotted lines in Figure 11.

In Figure 12 the ink producing member is placed within the exterior container 40, and the dipping space is within said member. Here the cylinder 41, acts as container and support for a solid mass of ink producing material 42, having a conical space 43 formed in it, which becomes the dipping space. The water is poured into the outer vessel and finds its way through passages 44 through the cylinder 41 and mass 42, until a common level is reached as indicated by the dotted line.

The same general principle is exemplified in Figures 13 and 14. Here the ink producing member is composed of a spiral sheet 45, with spacing cords 46, or the like, and held together by the bands 47. The dipping space is at 48. This sheet may be made of ink producing material or of absorbent material suitably impregnated. Or it may be composed of a neutral backing 49, with a facing 50 of ink producing material on one or both sides (see Figure 15). The water finds its way into the dipping space through the narrow spiral passage between the successive convolutions 45.

Another form is shown in Figure 16, wherein the ink producing material (upon impregnated cord or otherwise arranged) is wound spirally, as at 51, around the outside of the cylinder 52. When water is poured into 40 outside of 52, it finds its way along the spiral passages between the convolutions 51, and through suitable openings 53, until it rises within the dipping space to the common level indicated by the dotted line.

From what has been described herein, it is evident that my broad invention is capable of embodiment in a wide range of devices, and I do not limit myself to the details herein shown and described.

What I claim is—

1. Apparatus of the character described comprising a reservoir, a dipping space arranged so that liquid may flow into it from said reservoir and an ink producing member having free channels for the passage of water, connecting the reservoir with the dipping space.

2. Apparatus as in claim 1 wherein the ink producing member is removably applied to the reservoir.

3. Apparatus as in claim 1, wherein the ink producing member comprises a neutral backing bearing a coating of ink-producing material.

4. Apparatus as in claim 1, wherein the ink producing member comprises a neutral mass perforated to form the free channels aforesaid and having a coating of ink-producing material on the walls of said channels.

5. Apparatus as in claim 1 wherein the ink producing member is arranged with a spiral passage for admission of water.

6. An inkstand comprising in combination a dipping chamber, a container arranged so that liquid may flow therefrom into said dipping chamber and a mass comprising ink producing material interposed between said chamber and container and provided with a sensible passage leading to said dipping chamber whereby solvent may only flow from the container into the dipping chamber by passing through said mass.

7. An inkstand comprising in combination a dipping chamber, a container for solvent liquid and ink producing material interposed between said chamber and container and associated with a sensible passage or passages leading to said dipping chamber whereby solvent may only flow from the container into the dipping chamber by passing through said mass.

8. Apparatus as in claim 1 wherein the channels for passage of water have ink producing material contained in the walls of the same.

In testimony whereof I have hereto set my hand on this 25th day of July, 1921.

BYRON B. GOLDSMITH.